(12) United States Patent
Candelore et al.

(10) Patent No.: US 8,565,431 B2
(45) Date of Patent: Oct. 22, 2013

(54) SYSTEM AND METHOD FOR SCRAMBLING WIRELESS SIGNALS USING A SECURE TIME VALUE

(75) Inventors: Brant Candelore, San Diego, CA (US); Robert Hardacker, Escondido, CA (US); Chris Read, San Diego, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 1457 days.

(21) Appl. No.: 12/050,042

(22) Filed: Mar. 17, 2008

(65) Prior Publication Data

US 2009/0232308 A1 Sep. 17, 2009

(51) Int. Cl.
*H04K 1/00* (2006.01)

(52) U.S. Cl.
USPC .......................................................... 380/270

(58) Field of Classification Search
USPC ................... 380/200–204, 210, 270; 713/600; 348/14.02
See application file for complete search history.

(56) References Cited

U.S. PATENT DOCUMENTS

| | | | |
|---|---|---|---|
| 5,347,580 A | 9/1994 | Molva et al. | |
| 5,351,293 A | 9/1994 | Michener et al. | |
| 5,481,611 A | 1/1996 | Owens et al. | |
| 5,774,065 A | 6/1998 | Mabuchi | |
| 5,828,317 A | 10/1998 | Togashi | |
| 6,181,252 B1 | 1/2001 | Nakano | |
| 6,275,991 B1 * | 8/2001 | Erlin | 725/141 |
| 6,529,886 B1 * | 3/2003 | Campana et al. | 705/78 |
| 7,386,869 B1 * | 6/2008 | Bastien et al. | 725/6 |
| 7,622,963 B2 * | 11/2009 | Westwick | 327/90 |
| 7,796,757 B2 * | 9/2010 | McClenny et al. | 380/239 |
| 2003/0016119 A1 | 1/2003 | Teich | |
| 2004/0070516 A1 * | 4/2004 | Nielsen | 340/825.72 |
| 2005/0111659 A1 | 5/2005 | Shirai et al. | |
| 2007/0079132 A1 | 4/2007 | Tanaka | |
| 2008/0238709 A1 * | 10/2008 | Vaziri et al. | 340/825.22 |
| 2010/0297978 A1 * | 11/2010 | McClenny et al. | 455/344 |
| 2010/0315279 A1 * | 12/2010 | Hamai et al. | 341/176 |

FOREIGN PATENT DOCUMENTS

| | | | |
|---|---|---|---|
| JP | 8102982 A2 | 4/1996 | |
| JP | 8182058 A2 | 7/1996 | |

OTHER PUBLICATIONS

Digital Spy, "Thomson: DHD4000", http://www.digitalspy.co.uk/digitaltv/a15964/thomson-dhd4000.html, Apr. 13, 2005.
Siliconchip.com.au, "K180: A Rolling Code 4-Channel UHF Remote Control", http://www.crowcroft.net/kitsrus/k180.pdf, Jul. 2002.
Atmel, "AVR411: Secure Rolling Code Algorithm for Wireless Link", http://www.atmel.com/dyn/resources/prod_documents/doc2600.pdf, Nov. 2009.

* cited by examiner

*Primary Examiner* — Beemnet Dada
(74) *Attorney, Agent, or Firm* — Blakely, Sokoloff, Taylor & Zafman LLP

(57) ABSTRACT

According to one embodiment, the invention is directed to a method for securing communications with an electronic device. The method comprises obtaining a dynamic, non-repeating value from internal logic within a remote control. Thereafter, information including the non-repeating value is encrypted to produce an encrypted value, which is transmitted along with a radio frequency (RF) command from the remote control in order to restrict wireless control of the electronic device.

20 Claims, 5 Drawing Sheets

SYSTEM AND METHOD FOR SCRAMBLING WIRELESS SIGNALS USING A SECURE TIME VALUE

FIELD

Embodiments of the invention are generally directed to a system and method for securing one-way wireless signals, such as through an encryption scheme for example, using a secure encrypted time or a time signature.

GENERAL BACKGROUND

The majority of households receive television content through cable television systems or satellite television systems. Such systems are managed by service providers which have traditionally relied on a few original equipment manufacturer (OEM) suppliers of hardware (e.g., set-top boxes "STBs"). The reason is that the functionality of set-top boxes has not yet been integrated into digital televisions.

Under this scenario, menu navigation and television operational functions are generally controlled by a remote control supplied by the service provider (e.g., STE remote control). This regulates the television to the role of a simple display device, and thus, various enhanced capabilities of the television are often forgotten or are not used by the viewer. The reason is that such usage would require the viewer to maintain and utilize two different remote control devices to access the television's enhanced capabilities.

Moreover, certain service providers and third party manufacturers produce "universal" remote controls that incorporate the remote control codes for multiple device manufacturers. As a result, these remote controls are able to control devices built by someone else without payment of a license. Also, device manufacturers can build devices utilizing the remote control codes for other devices. The remote control codes can be reverse engineered and duplicated without regard to the original device manufacturer or the payment of a license.

Based on these activities, remote controls provided with the STB or third-party universal remote control devices often are used to control the television and other devices while the remote control provided with the electronic device is put aside and goes unused. In the case of a television, for example, the lack of use of the device-specific remote control can result in bypassing functionality and improved interfaces available from the television's built-in user interface. This hampers innovation of next-generation televisions, especially when costly enhanced capabilities and interfaces are normally not used by the user using "universal" remote controls, and hence, the additional costs incurred for these enhanced capabilities and interfaces cannot be easily recaptured by the television manufacturer.

BRIEF DESCRIPTION OF THE DRAWINGS

Certain illustrative embodiments illustrating systems and processes of operation may be best understood by the detailed description that follows taken in conjunction with the accompanying drawings in which.

DETAILED DESCRIPTION

Figure 1:
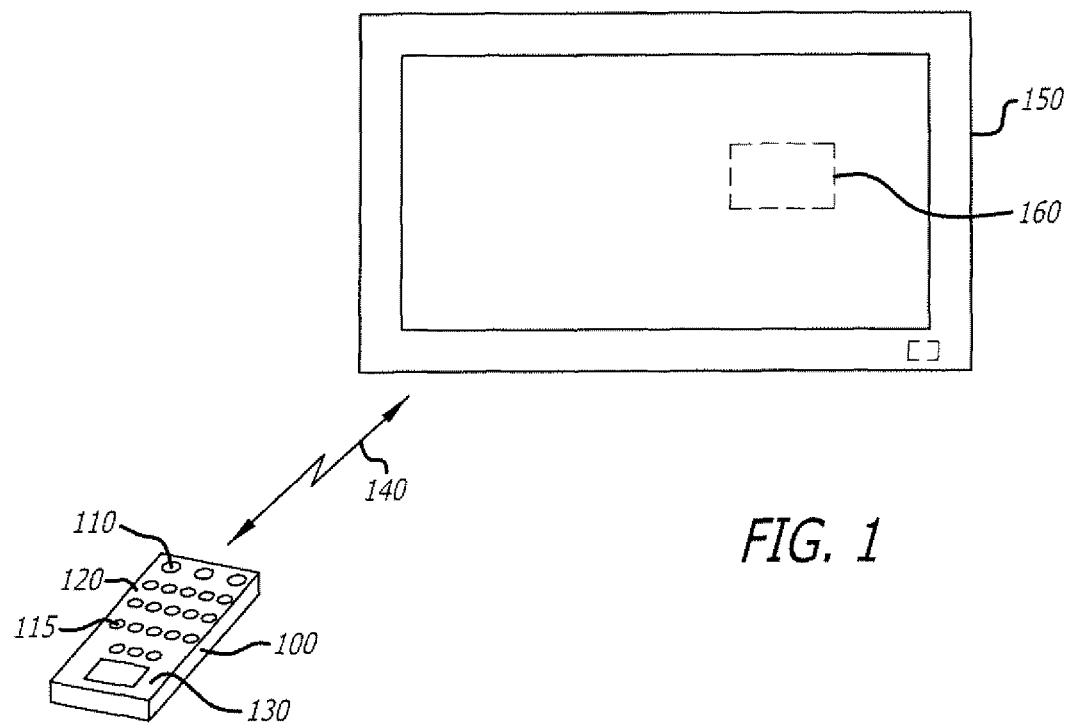
FIG. 1 is an exemplary block diagram of a remote control in wireless communications with an electronic device.

Embodiments of the invention are generally directed to a system and method for securing wireless signals transmitted from a remote control such as a television remote control for example. While this invention is susceptible of embodiments in many different forms, the drawings and description herein are intended as examples of the principles of the invention and are not intended to limit the invention to the specific embodiments shown and described.

Reference throughout this document to "one embodiment", "an embodiment" or similar terms means that a particular feature, structure, or characteristic described in connection with the embodiment is included in at least one embodiment of the invention. Thus, the appearances of such phrases in various places throughout this specification are not necessarily all referring to the same embodiment. Furthermore, the particular features, structures, or characteristics may be combined in any suitable manner in one or more embodiments without limitation.

The term "coupled", as used herein, is defined as connected, although not necessarily a direct connection nor a mechanical connection. Likewise, the term "or" as used herein is to be interpreted as an inclusive or meaning any one or any combination. Therefore, "X, Y, or Z" means "any of the following: X; Y; Z; X and Y; X and Z; Y and Z; X, Y and Z." An exception to this definition will occur only when a combination of elements, functions, operations or acts are in some way inherently mutually exclusive.

The term "software," as used herein, is generally defined as a sequence of instructions designed for execution by a processor. Types of "software" may include, but are not limited or restricted to a subroutine, a function, a procedure, and object method, an object implementation, in an executable application, an applet, a servlet, a source code, an object code, a shared library/dynamic load library and/or other sequence of instructions designed for execution.

The term "television programming" is generally any sequence of audio-video content such as those which would be interpreted as and reported in an electronic program guide (EPG) as a single television program, without regard as of its particular content type such as a movie, sporting event, segment of a multi-part series, news broadcast, etc. The term "television programming" may also be interpreted to encompass commercials and other program-like content which may not be reported as a program in the EPG.

The term "processor" is used herein to encompass both hard and programmed, special purpose, general purpose and programmable devices that may encompass one or more integrated circuits. Types of processors include, but are not limited or restricted to microprocessors, digital signal processors, controllers, microcontrollers, programmable logic arrays, application specific integrated circuits, or the like.

In accordance with one or more embodiments of the invention, it is advantageous to associate a remote control with a television receiver or other controlled device so that either (i) the associated remote control is the only device that can control the controlled device, or (ii) only limited additional functionality can be realized by any remote control that is not the associated remote control. Embodiments consistent with the invention can be used for many purposes including precluding access or full access to control of certain devices without use of the properly associated remote control.

According to one embodiment of the invention, described herein for clarity sake, the controlled electronic device is a television and the remote control is a television remote control. However, other remote control operated electronic devices can also serve as the controlled device (e.g., videotape players, set-top boxes (STEs), set back boxes, audio equipment, digital video disc "DVD" players, digital video recorders, and other audio/video "A/V" devices). Hence, although the examples presented may reference a television or television receiver, other such devices are also within the realm of embodiments consistent with the invention.

Referring now to FIG. 1, an exemplary block diagram of a remote control 100 in wireless communications with an electronic device 150 is shown. Herein, remote control 100 transmits wireless signals 140 to electronic device 150 in order to control the operations of electronic device. These wireless signals 140 may include, but are not limited or restricted to radio-frequency (RF) signals featuring a RF command signed with an encrypted dynamic value such as an encrypted time field as described below.

As shown in FIG. 1, upon depressing a Power-On button 110 on a keypad 120, remote control 100 transmits wireless signal 140, such as a RF Power-On command for example, to electronic device 150. Upon receipt of RF Power-On command 140, electronic device 150 is powered and is now adapted to receive other RF command signals that control the operations of electronic device 150.

Figure 2:
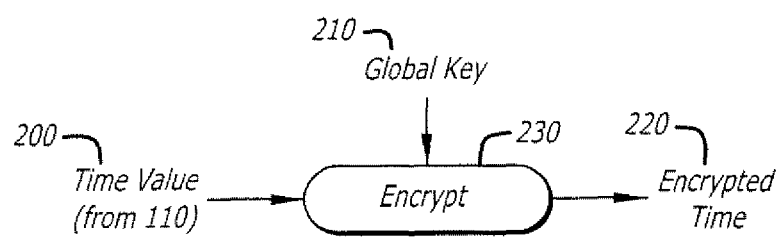
FIG. 2 is an exemplary block diagram of a process for securing a dynamic variable such as time from a real-time clock implemented within internal logic of the remote control of FIG. 1.

According to one embodiment of the invention, as shown in FIG. 2, before transmission of RF Power-On command 140, a time value 200 is extracted from internal logic 130 (e.g., processor with real-time clock circuitry) within remote control 100 of FIG. 1. The time value could be Coordinated Universal Time (UTC) based on Unix®—often called "Unix Time". Unix Time counts the number of seconds from the Unix epoch on Jan. 1, 1970. The time can be represented by 32 bits (of which one is a sign bit). Time value 200 is encrypted in real time using a "global" symmetric key 210 so as to produce an encrypted time value 220 (hereinafter referred to as "encrypted time"). By the term "global," the key is shared by multiple televisions and remote control units, perhaps universally shared or shared by the year or make of the television and remote control unit. One algorithm 230 used for encryption purposes is a Sony® proprietary algorithm referenced in U.S. Published Application No. 2005-0111659 filed Sep. 28, 2004, the contents of which are incorporated by reference.

Figure 3:
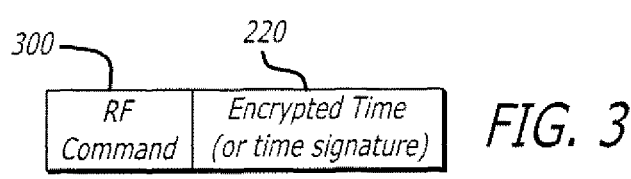
FIG. 3 is an exemplary block diagram of a process for attaching the secured dynamic variable to an RF command transmitted from the remote control of FIG. 2.

As shown in FIG. 3, encrypted time 220 is attached to a RF command 300 such as RF Power-On command 140 or any other or all RF commands transmitted by remote control 100 of FIG. 1 to electronic device 150. For instance, encrypted time 220 may be attached only to Power-On command 140. Alternatively, encrypted time 220 may be attached to another type of RF command (e.g., channel adjustment commands) or perhaps all RF commands transmitted from remote control 100.

In an alternative implementation, the RF command code can be XOR'ed on to the 32-bit time code value before it is encrypted. If this is performed, then the encrypted result would be referred to as a "time signature," which is similarly transmitted with RF command code 300 as shown in FIG. 3.

In an alternative implementation, the global key can be replaced with a unique public/private key pair. The remote control public key can be shared during a "power-on" command. In this implementation, the public key may not need to be delivered in a certificate if a common modulus is used. The modulus does not need to be sent since it would be known. In this scenario, for example, 256-bit RSA could be used—on average the public key would be 128-bits and the encrypted time (or the time signature) would be 256-bits.

Figure 4:
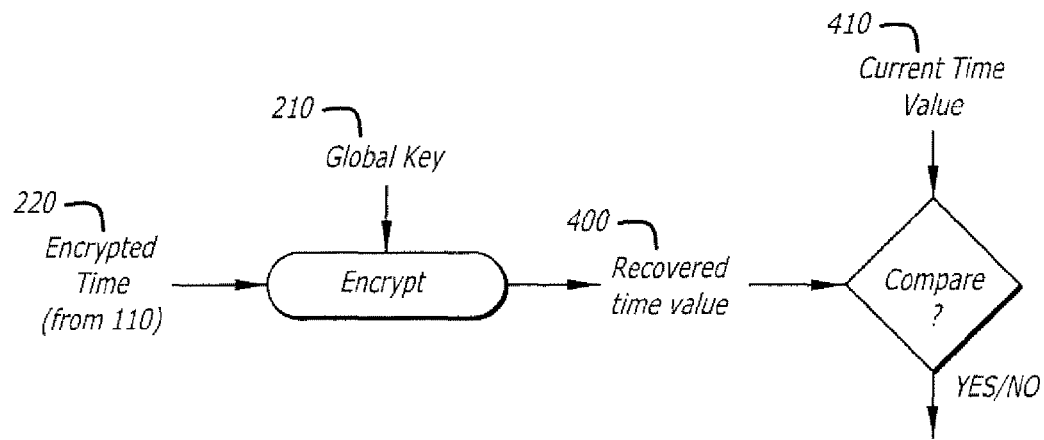
FIG. 4 is an exemplary block diagram of a process for recovering and comparing the secured dynamic variable to authenticate the remote control of FIG. 1.

As shown in FIGS. 1 and 4, electronic device 150 of FIG. 1 includes internal logic 160 (e.g., a real-time clock circuit) that is generally synchronized in time with internal logic 130 of remote control 100 so that a comparison can be made between a time value 400 recovered from encrypted time 220 using the same cryptographic algorithm and global key and a current time value 410 as measured within internal logic 160 of FIG. 1. If these time values 400 and 410 are within a maximum predetermined threshold, for instance within two minutes or less of each other or within seconds of each other (e.g., ten seconds) if smaller granularity is desired, electronic device 150 determines a successful (YES) comparison and it will be allowed to be controlled by remote control 100. Otherwise, electronic device 150 will ignore the commands from remote control 100 or may initiate a screen pop-up to advise the user that remote control 100 is not recognized and to perform certain operations or contact a representative for the manufacturer of electronic device 150.

Figure 5:
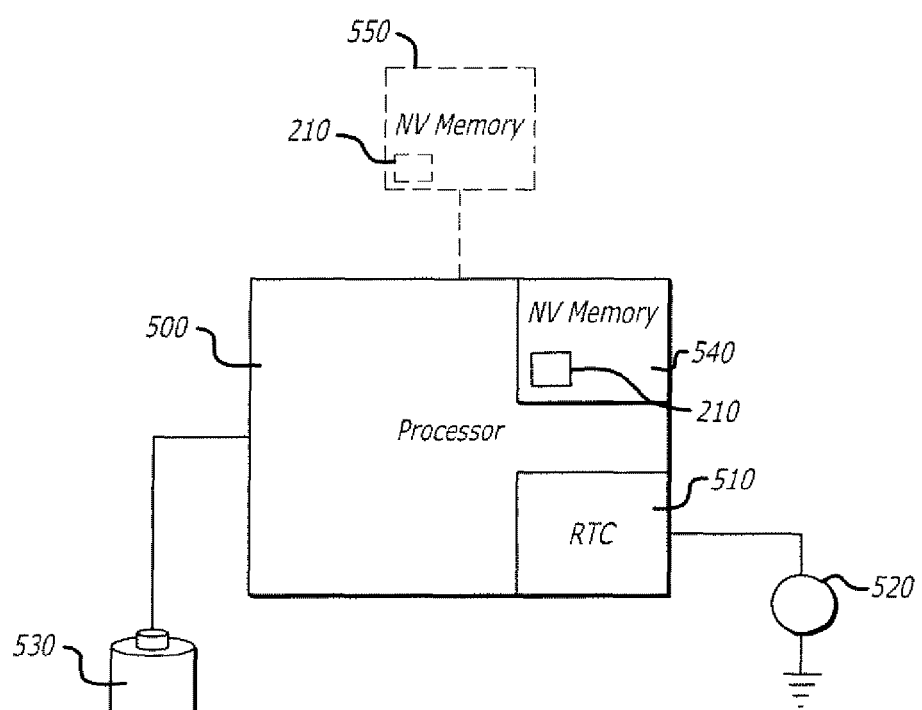
FIG. 5 is an exemplary block diagram of internal logic within the remote control of FIG. 1.

Referring now to FIG. 5, an exemplary block diagram of internal logic 130 within remote control 100 of FIG. 1 is shown. Herein, remote control 100 comprises a processor 500 that is adapted to produce RF commands in response to depression of buttons on keypad 120. In addition, processor 500 comprises a real-time clock circuit 510 that receives back-up power from a coin cell battery 520. The main power source for processor 500 is provided by replaceable batteries 530 (e.g., AA or AAA batteries) that are stored in a battery compartment (not shown) within remote control 100.

According to one embodiment of the invention, processor 500 further comprises on-chip nonvolatile memory, e.g. battery-backed on-chip RAM (random access memory), ROM (read only memory), or on-chip flash 540 that is loaded with global key 210. As a result, processor 500 may operate as a crypto-processor for securely encrypting a current time value from RTC 510 using global key 210. Alternatively, as represented by dashed lines, global key 210 may be stored within off-chip nonvolatile memory 550 possibly encrypted and uploaded by processor 500 for creation of the encrypted time value for transmission with a RF command. The advantage of RTC 510 is that it is not susceptible to a replay attack and can operate in a 1-way manner. Since time keeps advancing, the values are unique. It does not require the initialization of a count value in the electronic device (e.g., television), as discussed below.

Figure 6:
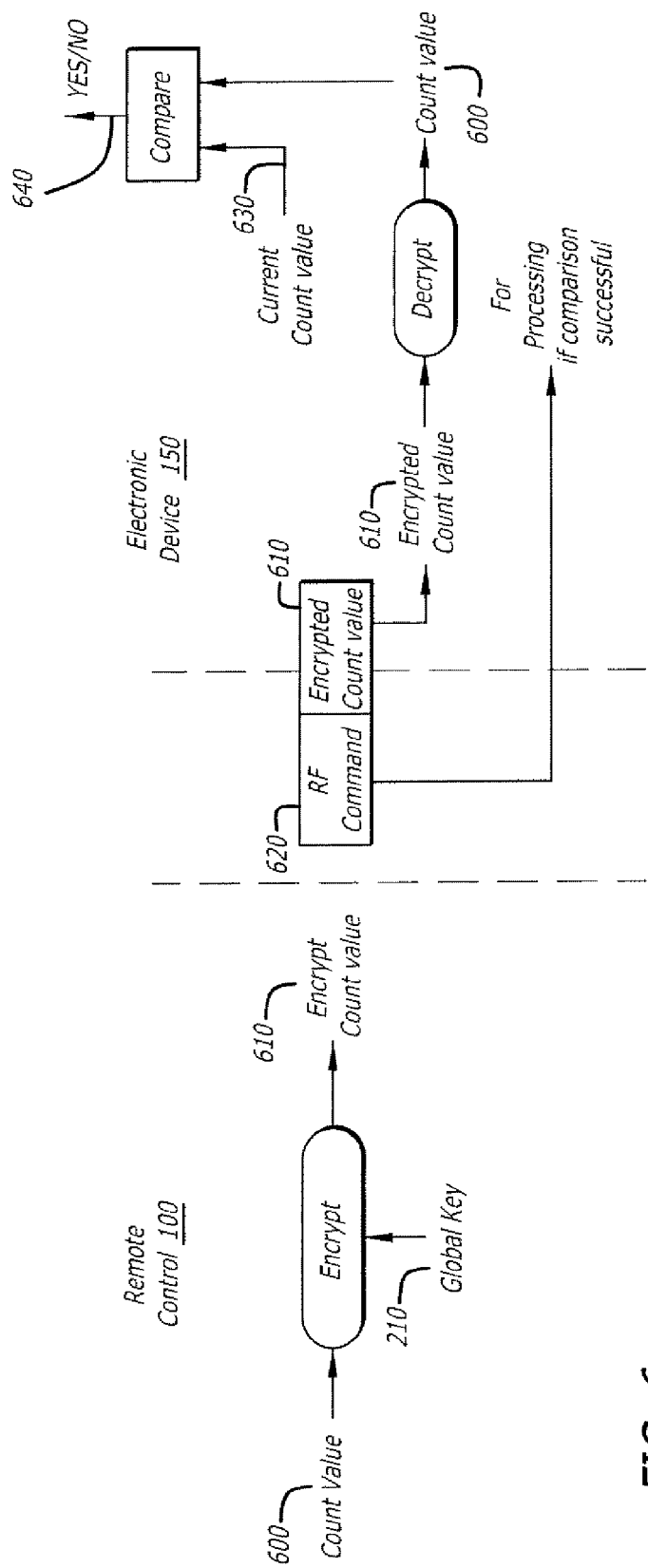
FIG. 6 is an exemplary block diagram of a process for securing a dynamic variable such as count values received from a non-resetting counter implemented within internal logic of the remote control of FIG. 1.

According to another embodiment of the invention, as shown in FIG. 6, before transmission of a RF command (e.g., RF Power-On command 140), a generated value 600 that is dynamic in nature, such as a non-resetting count value for instance, is extracted from internal logic 130 within remote control 100 of FIG. 1. While the count may not be resettable in the remote control, the electronic device, such as a television, may need to be wary of a replay attack. A count value which is to be initialized in the TV should be advancing. Or least, in case of a new remote being deployed, should not be re-initializing with the same value over-and-over. Count value 600 is encrypted in real time using "global" symmetric key 210 so as to produce an encrypted count value 610. The count value approach has the benefit of not requiring a RTC which requires a battery to keep the circuit perpetually alive. Care must be taken to avoid a replay.

As further shown in FIG. 6, encrypted count value 610 is attached to a RF command 620 for transmission to electronic device 150. Electronic device 150 includes internal logic 160 featuring a counter that is generally synchronized in count with a counter within remote control 100 which is used to recover count value 600 so that a comparison can be made between the count value recovered from encrypted count value 610 and a current count value 630 produced by the counter within electronic device 100. If these counts are within a maximum predetermined threshold, for instance within a few counts (e.g., less than 5), electronic device 150 will be allowed to be controlled by remote control 100 as denoted by process signal 640.

Figure 7A:
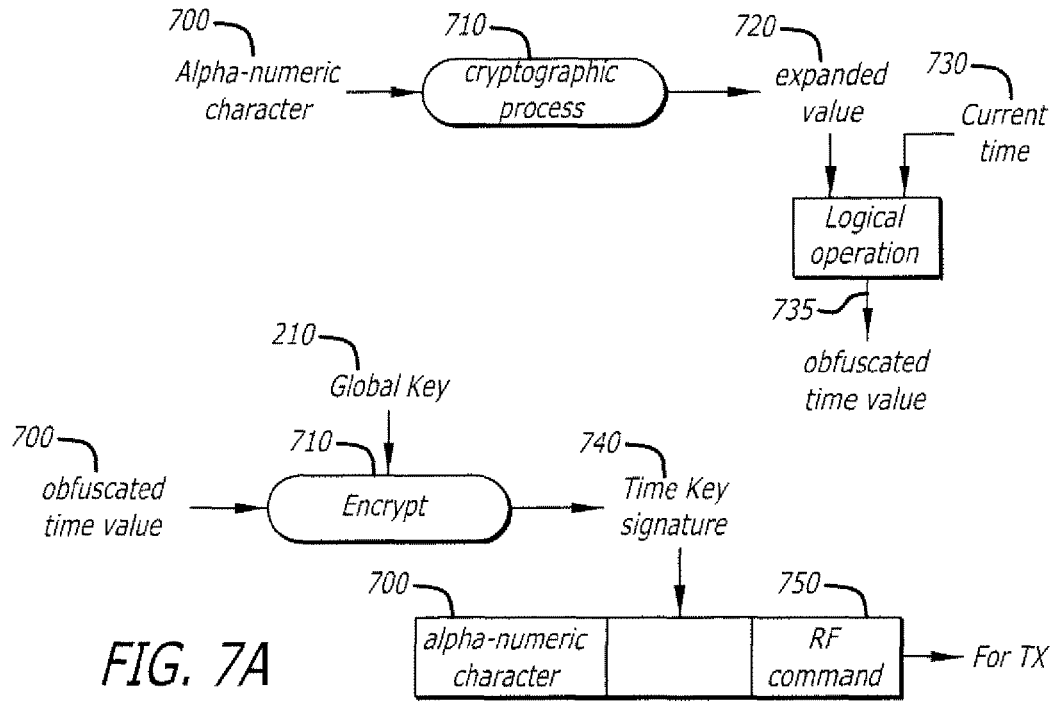
FIGS. 7A and 7B are exemplary block diagrams of a second process for securing a dynamic variable such as time from a real-time clock implemented within internal logic of remote control of FIG. 1.

Referring now to FIG. 7A, a third exemplary block diagram of a process for securing a dynamic variable such as time measurements from a real-time clock circuit implemented within internal logic 130 of remote control 100 (see FIG. 1) is shown. Herein, an alpha-numeric character 700 represented by a bit value less than 10 bits (e.g., a 7-bit American Standard Code for Information Interchange "ASCII") is expanded by a cryptographic process 710 (e.g., one-way hash function, encryption, etc.) to produce an expanded value 720 that is magnitudes greater in bit width than character 700. For instance, value 720 is 128-bits, 256-bits or even larger.

As further shown in FIG. 7A, according to one embodiment of the invention, value 720 undergoes a logical operation (e.g., Exclusive-OR "XOR" operation) with a current time value 730 to produce an obfuscated time value 735 that is subsequently encrypted using global key 210 to produce a time key signature 740. Time key signature 740 accompanies a RF command 750 along with alpha-numeric character 700 that is subsequently expanded using the same cryptographic process at electronic device 150 for use in time comparison purposes using time key signature 740 or contents therein.

Figure 7B:
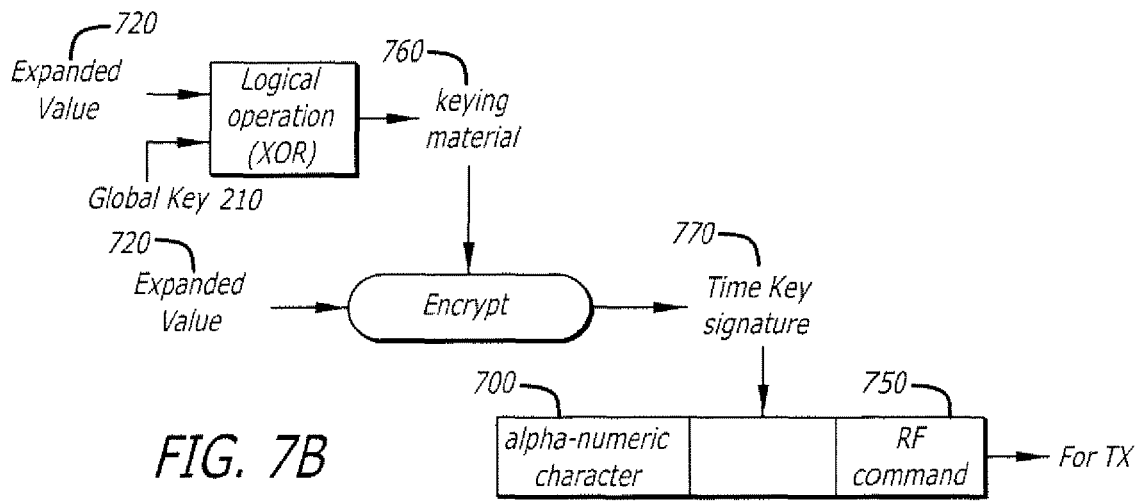

As further shown in FIG. 7B, according to another embodiment of the invention, global key 210 undergoes a logical operation (e.g., XOR operation) with value 720 to produce obfuscated keying material 760. Keying material 760 is used for encrypting current time value 730 to produce a time key signature 770. Time key signature 770 accompanies a RF command 750 along with alpha-numeric character 700 that is expanded at electronic device 150 for re-creation of keying material 760 for decryption and subsequent comparison of current time value 730 with a current time of electronic device 150.

Figure 8:
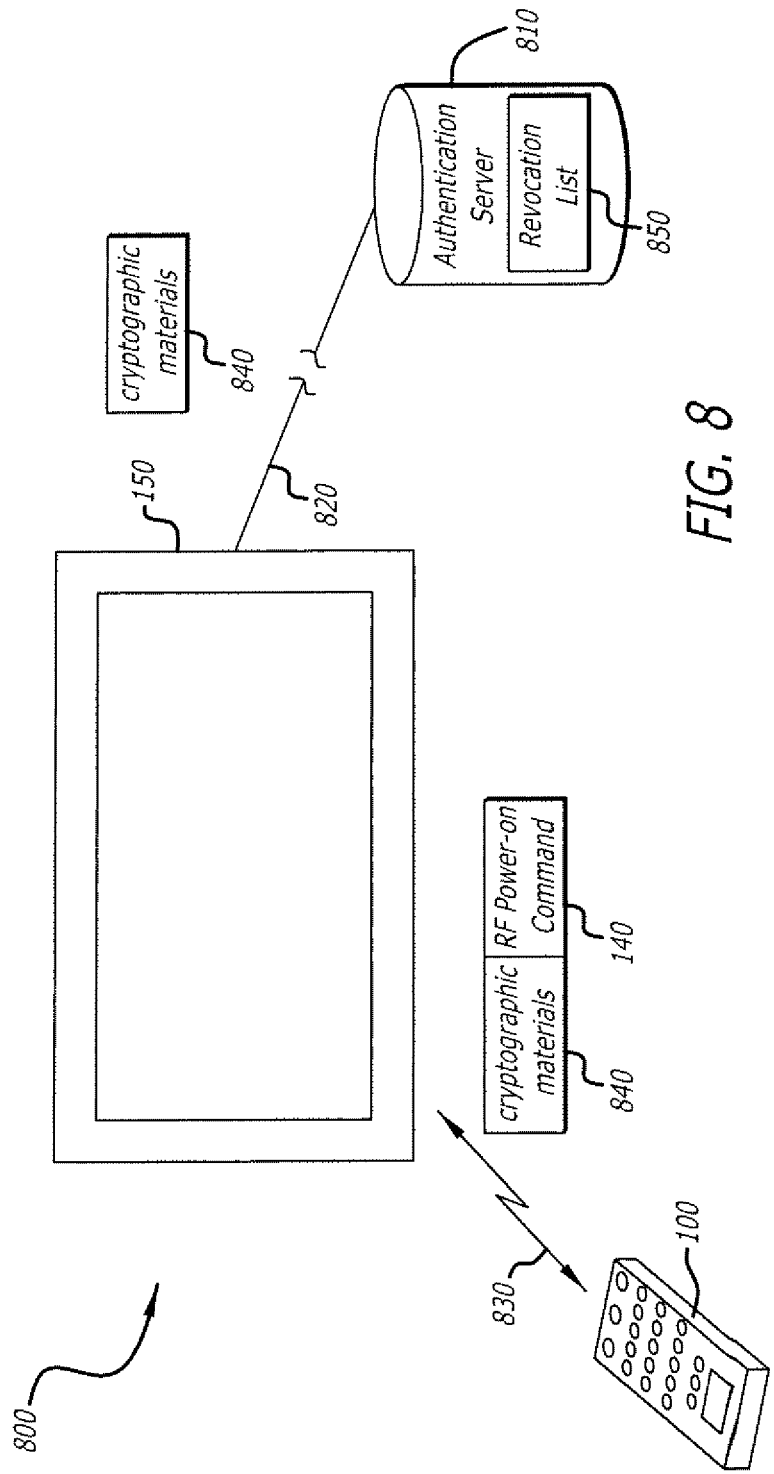
FIG. 8 is an exemplary block diagram of a revocation system is shown, where the revocation system is configured to revoke and reissue cryptographic materials if such materials are compromised.

Referring now to FIG. 8, an exemplary block diagram of a revocation system 800 is shown, where system 800 is configured to revoke and reissue cryptographic materials if such materials are compromised. In this scenario, the alphanumeric character 700 of FIG. 7A is expanded to also include a model number or remote control serial number. These fields are also included in the field 700. The electronic device can examine the model number and/or serial number to see if these numbers appear on a revocation list. The revocation operations may be performed in combination with the use of the time key signature as described above.

More specifically, electronic device 150 (e.g., a television) is in secure, mutually authenticated, communication with an authentication server 810 over a first communication path 820, for example, using Secure Socket Layer (SSL), and is in wireless communications with remote control 100 over a second communication path 830. In response to a particular event, such as a Power-On event or prompted display of the EPO in response to depression of the Guide (or Menu) button 115 on keypad 120 of FIG. 1 by the viewer or the like, television 150 downloads cryptographic materials received from remote control 100 for authentication.

For instance, according to one embodiment of the invention, remote control 100 transmits cryptographic materials 840 along with RF Power-On command 140. As an illustrative example, cryptographic materials 840 may include a serial number, public key or a digital certificates containing the same information, signed by a certificate authority and associated with remote control 100 and stored in non-volatile memory. As another illustrative embodiment, cryptographic materials 840 may include a hash value (resulting data after the global key undergoes a one-way hash function).

The transmitted cryptographic materials 840 are received by television 150 and routed to authentication server 810 for comparison with a periodically updated revocation list 850 to determine if cryptographic materials 840 have been compromised. If cryptographic materials 840 have not been compromised, authentication server 810 transmits a message to television 150 in order to signal that communications with remote control 100 can continue. Such signaling may cause no visible change in the operations of television 150 or may cause a display screen to identify that authentication has been successful.

Otherwise, if cryptographic materials 840 have been compromised, authentication server 810 transmits a message to television 150 in order to discontinue communications with remote control 100. The message may prompt a display screen to advise the viewer to contact the service provider regarding the matter or may transmit a signal to remote control 100 itself if it adapted to support bidirectional communications. This may prompt remote control 100 to acquire another certificate from television 150 based on a series of display screens prompting certain operations to be conducted by the viewer using remote control 100. For instance, television may prompt remote control 100 to upload its serial number through depression of a certain series of buttons, where the serial number is transmitted to authentication server for analysis and transmission of a new certificate as warranted.

In another embodiment, the television transmits the remote control serial number to the authentication server. Authentication server 810 delivers the remote control global key 210 or public key (associated with the private key in the remote control) required by that remote control. The global key or public key is expected to be used in a number of remote controls, but conceivably could be unique per remote control. In the case of the public key, the delivery from authentication server 810 would prevent the need to send it to electronic device 150 from remote control 100 of FIG. 1.

Additionally, it will be evident that various modifications and changes may be made thereto without departing from the broader spirit and scope of the present invention as set forth in the appended claims. Therefore, the specification and drawings are accordingly to be regarded in an illustrative rather than in a restrictive sense.

What is claimed is:

1. A method for securing communications with an electronic device, comprising:
   obtaining a dynamic, non-repeating value from internal logic within a remote control;
   encrypting, within the remote control, information including the non-repeating value to produce an encrypted value;
   transmitting, by the remote control, the encrypted value with a wireless command in order to restrict wireless control of the electronic device;
   decrypting the encrypted value by the electronic device to recover the non-repeating value;
   comparing the non-repeating value with a current value as measured by internal logic of the electronic device; and
   granting the remote control access to control the electronic device when the current value and the non-repeating value differ by less than a predetermined threshold,
   wherein the non-repeating value is a time value from the internal logic within the remote control, the internal logic within the remote control being a real-time clock circuit.

2. The method of claim 1, wherein the encrypted value is a result of a logical, Exclusive OR (XOR) operation of a command code and the non-repeating value.

3. The method of claim 1, wherein the wireless command is a Power-On command that causes the electronic device to be powered.

4. The method of claim 3, wherein the electronic device is a television.

5. The method of claim 1, wherein (i) the predetermined threshold being a prescribed duration of time from the current value being a current time value and the time value and (ii) the remote control is granted access to control the electronic device if the current time value is within the prescribed duration of time from the time value.

6. A method for securing wireless communications between a remote control and a television, the method comprising:
   obtaining a time value from a clocking circuit implemented within the remote control;
   encrypting at least the time value within the remote control to produce an encrypted time value;
   transmitting the encrypted time value with a wireless command from the remote control in order to restrict only the remote control as having wireless control of the television;
   decrypting the encrypted time value by the television to recover the time value;
   comparing the time value with a current time value from internal logic within the television; and
   granting the remote control access to control the television when the current time value and the time value differ by less than a predetermined threshold.

7. The method of claim 6, wherein the clocking circuit is a real-time clock circuit implemented within the remote control.

8. The method of claim 6, wherein the time value is dynamic and non-repeating.

9. The method of claim 6, wherein the wireless command is a Power-On command that causes the electronic device to be powered.

10. The method of claim 6, wherein the internal logic of the television being a real-time clock circuit.

11. The method of claim 6, wherein (i) the predetermined threshold being the current value is a current time value subsequent to the time value and (ii) the remote control is granted access to control the electronic device if the current time value is within the prescribed duration of time from the time value.

12. A remote control device adapted for wireless communications with an electronic device, the apparatus comprising:
   a main power source;
   a secondary power source; and
   a processor coupled to the main power source and the secondary power source, the processor comprises
      a real-time clock circuit that is adapted to produce a time value,
      logic to encrypt information including the time value to produce an encrypted value, and
      logic to transmit the encrypted value with a wireless command in order to restrict wireless control of the electronic device by the remote control device,
   wherein responsive to receiving the encrypted value, the electronic device decrypting the encrypted value to recover the time value, comparing the time value with a current time value produced by internal logic within the electronic device, and granting the remote control device access to control the electronic device when the current time value and the time value differ by less than a predetermined threshold.

13. The remote control device of claim 12, wherein the main power source is at least one replaceable battery.

14. The remote control device of claim 13, wherein the secondary power source is at least one coin cell.

15. The remote control device of claim 14 being in wireless control of the electronic device being a television.

16. The remote control device of claim 14 being in wireless control of the electronic device being a television, the television comprising the internal logic including a second real-time clock circuit, a wireless receiver to receive the wireless command and the encrypted value from the remote control device and logic to decrypt the encrypted value to obtain the time value and to compare the time value to the current time value from the second real-time clock circuit, wherein the electronic device allows for the remote control device to control operations of the electronic device when the time value is within the predetermined threshold being a prescribed duration between the current time value and the time value.

17. A method for securing communications with an electronic device, comprising:
   obtaining a dynamic, non-repeating value from internal logic within a remote control, the non-repeating value is a count value and the internal logic is a counter not based on time;
   encrypting, within the remote control, information including the non-repeating value to produce an encrypted value;
   transmitting, by the remote control, the encrypted value with a wireless command in order to restrict wireless control of the electronic device;
   decrypting the encrypted value by the electronic device to recover the non-repeating value;
   comparing the non-repeating value with a current value as measured by internal logic of the electronic device; and
   granting the remote control access to control the electronic device when the current value and the non-repeating value differ by less than a predetermined threshold, wherein
   the remote control is granted access to control the electronic device when the current value, being a second count value that is greater than the count value, is within the predetermined threshold being a prescribed count from the count value.

18. The method of claim 17, wherein the encrypted value is a result of a logical, Exclusive OR (XOR) operation of a command code and the non-repeating value.

19. The method of claim 17, wherein the wireless command is a Power-On command that causes the electronic device being a television to be powered.

20. The method of claim 17, wherein the non-repeating value is an increasing count value from the internal logic within the remote control.

* * * * *